J. L. WOODBRIDGE.
SYSTEM OF ELECTRICAL DISTRIBUTION.
APPLICATION FILED APR. 19, 1904.
1,051,940.
Patented Feb. 4, 1913.
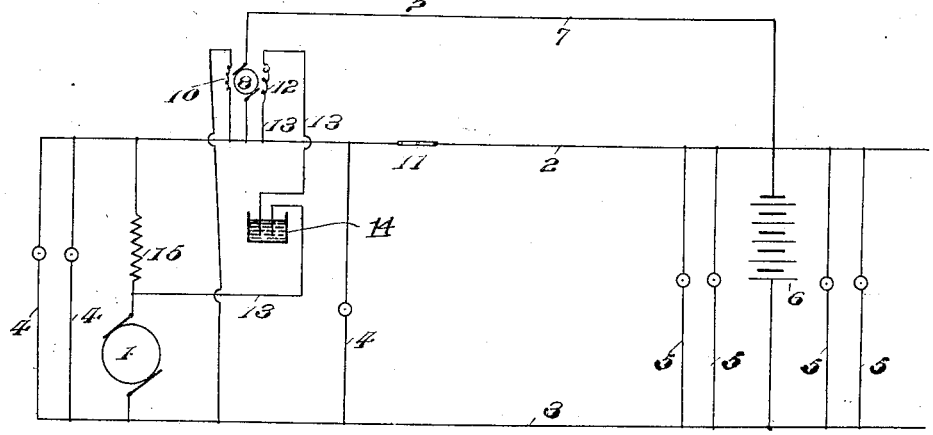
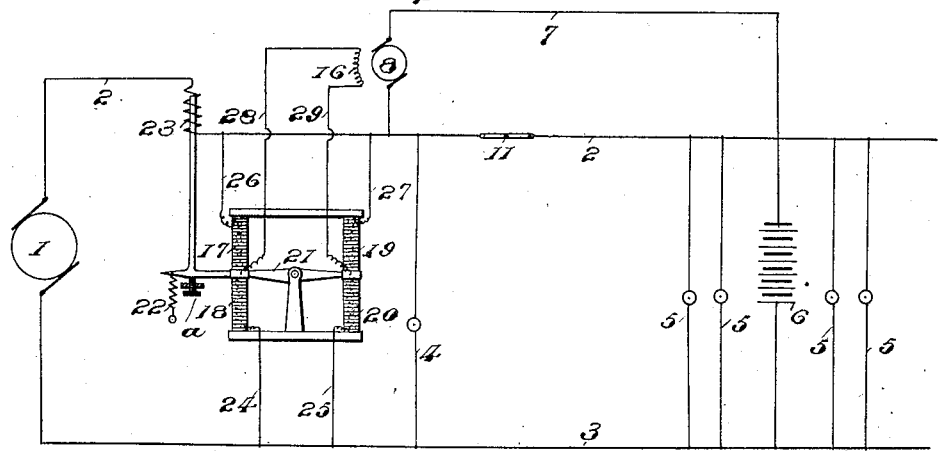
Witnesses
W. T. Williams
Jas. B. Richmond
Inventor
J. Lester Woodbridge.
by
Augustus B. Stoughton.
Attorney

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,051,940.

Specification of Letters Patent.  Patented Feb. 4, 1913.

Application filed April 19, 1904. Serial No. 203,837.

*To all whom it may concern:*

Be it known that I, JOSEPH LESTER WOODBRIDGE, a citizen of the United States, residing at Philadelphia, in the county of Philadelphia and State of Pennsylvania, have invented a certain new and useful System of Electrical Distribution, of which the following is a specification.

The invention has relation to a system of electrical distribution in which there is employed what is called a floating battery, that is to say, a battery arranged across the line, which may be located at a considerable distance from the power house; and its object is to enable such a line battery to do more or less regulation of the station load, even when fluctuations are caused by load near the generator and remote from the battery.

To this and other ends hereinafter set forth the invention comprises the improvements to be presently described and finally claimed.

The nature, characteristic features and scope of the invention will be more fully understood from the following description taken in connection with the accompanying drawings forming part hereof and in which—

Figures 1, 2, and 3, are diagrammatic views illustrating systems of distribution embodying features of the invention.

In the drawings, 1 is the station generator or generators.

2 and 3 are the line conductors.

4 and 5 indicate translating devices, which constitute the load.

6, is a storage battery connected across the conductors 2 and 3 and located, for example, at a point remote from the generator 1, as for instance, at or near the end of a trolley line.

7, is a feeder connected with the battery 6 and boosted as by a suitably driven booster, whose armature is shown at 8.

The conductor 2 may be interrupted out on the line, for example, by opening the switch 11.

In Fig. 1, the field coil 12 of the booster carries not the whole current, but a portion of it by way of the conductor 13 in which is interposed a source of counter-electro-motive force such as the cell 14, which is in series with the field 12.

15, is a resistance in series with the generator and it or a portion of it may be the generator series field. When a predetermined load is upon the generator, the drop across the resistance 15 by suitable adjustment may be made equal to the maximum counter-electro-motive-force of the cell, for example 2.5 volts and any increase of load beyond this will divide, part going by way of 12 since the counter-electro-motive-force of the cell 14 has been overcome, thus reducing the voltage of the booster by causing the coil 12 to oppose the coil 10 and thus reducing the current in the battery feeder, and therefore the load on the generator. At times when the load on the generator is less than the predetermined amount, the coil 12 is not energized because the cell 14 has no capacity and therefore for all practical purposes cannot discharge. Structurally the part 14 is an electrolytic cell and is, therefore, so illustrated. By way of further description it may be said that as shown it comprises a jar containing a suitable electrolyte, such as dilute sulfuric acid and two like metallic plates, such as platinum or sheet lead without active material.

Referring to Fig. 2, the booster has but one field coil 16 and the current through it is controlled or even reversed to effect the mode of operation above described. 17, 18, 19 and 20 indicate piles or groups of carbon or other material whose electrical resistance is responsive to changes in pressure. 21, is an insulated centrally pivoted lever adapted when turned, to change the pressure upon the various members of the groups. This lever is counter-balanced as by a spring or weight 22 and is connected with a solenoid 23, whose coil is interposed in the conductor 2. The ends of the respective groups are connected with the leads 2 and 3 as by the conductors 24, 25, 26 and 27. The central portions of the groups are connected as by conductors 28 and 29 with the booster field coil 16 so that if the pressure on all of the groups is equal no current traverses the coil 16. *a*, is an adjustable back stop for relieving the pressure produced by the spring 22 upon the carbons. Under normal conditions the pressure on the carbons is so adjusted by means of the back stop *a*, that current passing through the coil 16 by way of 27, 19, 29, 28, 18, 24 is sufficient to excite the booster in such a way that it sends the proper amount of current through 7 to the battery. Under these conditions the carbon piles 18 and 19 are under pressure and as the load increases on the generator the solenoid 23 exerts an increasing force tending to overcome the tension of the spring 22 and at a predetermined load this pull is sufficient to relieve the pressure of the lever 21 upon the stop $a$. Should the load increase beyond this predetermined amount, additional pressure will be exerted upon the groups 17 and 20, whereby their resistance will be diminished in comparison with the groups 18 and 19, which are relieved from pressure. As a result of this, the current through 16 is reduced thus causing the booster to send less current by way of the feeder 7 to the battery, thereby relieving the generator of load and if the load on generator continues to increase sufficiently the first effect will be to equalize the pressure on the groups and thus reduce the current in 16 to zero and the second effect will be to decrease resistance of 17 and 20 and increase the resistance of 18 and 19, thereby sending current in reverse direction through 16 by way of 26, 17, 28, 29, 20 and 25, thereby actually causing the booster to assist the battery to discharge by way of the feeder thus actually supplying current near the station to relieve the overload.

Referring to Fig. 3, the booster and feeder are omitted and the counter-electro-motive force cell $b$, is placed in parallel with the series field $c$ of the generator 1. The resistance of the coil $c$ is so adjusted that at a predetermined load on the generator the drop across the coil $c$ is equal to the maximum counter-electro-motive-force of the cell, for example 2.5 volts. When the load increases beyond this a portion of the current will pass through the cell thus reducing the compounding effect of the coil $c$, and causing the voltage of the generator to fall, thereby causing the generator to send less current to the battery. When the load is less than the predetermined amount the cell $b$, having no capacity cannot discharge through the coil $c$ and will therefore have no effect upon the operation of the generator.

From the foregoing description it is apparent that the effect produced is to relieve the generator of a portion or all of the fluctuations of load above a predetermined maximum at the same time permitting the battery to be located on a line at a distance from the generator. Otherwise stated, the effect is to enable a line battery to do more or less regulation of the station load, even when fluctuations are caused by load near the station and remote from the battery, which latter may additionally perform the function of a floating battery.

The novel features of invention specific to the construction of Fig. 2 are not all claimed herein, as they are made the subject matter of my application for a patent filed May 27, 1911, Serial Number 629,925.

It will be obvious to those skilled in the art to which my invention relates that modifications may be made in details without departing from the spirit thereof, hence I do not limit myself to the described mode of procedure, but

Having thus described the nature and objects of my invention, what I claim as new and desire to secure by Letters Patent is—

1. In a system of electrical distribution which includes a generator and its load circuit and a battery and its load circuit distant from the generator, the combination of a circuit connecting the battery and generator and provided with a booster adapted to normally transmit constant current from the generator to the battery, and means responsive only to such load on the generator as is in excess of a pre-determined load and adapted to reduce the voltage of the booster and thereby reduce the current transmitted to the battery, substantially as described.

2. In a system of electrical distribution, the combination of two sources of electrical energy connected in parallel relation and apparatus for controlling the division of load between them including a device responsive to load variations on one of them in one direction from a predetermined value, but non-responsive to load variations in the other direction.

3. A system of electrical distribution comprising the combination of a generator and its line, a battery floated on the line at a distance from the generator, a feeder extending from near the generator to the battery, a booster in the feeder, a resistance in series with the generator, a field coil for the booster in parallel with said resistance, and a counter-electro-motive-force cell in series with the booster field coil, substantially as described.

4. In a system of electrical distribution the combination of two sources of electrical energy connected in parallel relation and apparatus for controlling the division of load between them including a device responsive to variations of load on one of them in excess of a predetermined value but non-responsive to variations of load less than said value.

5. In combination, a consumption circuit, a branch circuit containing a generating source, another branch circuit containing a storage battery, means for controlling the relative current strengths in the two branches including a device responsive to variations of current strength above a certain value but non-responsive to variations of current strength below said value.

6. In combination, a generating source, a circuit containing a storage battery, a booster connected between the source and the battery circuit and adapted normally to transmit a substantially constant current to the battery circuit, and a device responsive only to such load on the source as is in excess of a predetermined value and adapted to vary the booster voltage to reduce the current transmitted between the source and the battery.

7. In combination, a source of electrical energy and its load circuit, a storage battery and its load circuit, means for normally transmitting a substantially constant current from the source to the battery, and other means inactive until the load on the source exceeds a certain value and adapted upon such excess to reduce the current transmitted from the source to the battery.

8. In an electrical system of distribution, the combination of a consumption circuit, two sources of electrical energy in operative relation thereto, means for controlling the division of load between them, and other means responsive to changes of electrical condition in excess of a certain magnitude but non-responsive to lesser changes and adapted to modify the action of the first mentioned means.

9. In an electrical system of distribution, the combination of a consumption circuit, two sources of electrical energy in operative relation thereto, and means for controlling the division of load between them, said means responsive to changes of electrical condition in excess of a certain magnitude but non-responsive to lesser changes.

10. In an electrical system of distribution, the combination of a consumption circuit, two sources of electrical energy in operative relation thereto, and regulating apparatus adapted to discriminate between different degrees of load fluctuation whereby fluctuations within a certain range are referred to one source and fluctuations outside of that range are referred to the other.

11. In combination, two sources of electrical energy connected in parallel relation, apparatus for controlling the division of load between them including a coil for affecting the operation of said apparatus, and means adapted to prevent certain changes of load from influencing said coil but permit other changes of load to influence said coil.

In testimony whereof I have hereunto signed my name.

J. LESTER WOODBRIDGE.

Witnesses:
W. J. JACKSON,
K. M. GILLIGAN.

Copies of this patent may be obtained for five cents each, by addressing the "Commissioner of Patents, Washington, D. C."